(12) United States Patent
Williams et al.

(10) Patent No.: US 10,825,213 B2
(45) Date of Patent: Nov. 3, 2020

(54) COMPONENT-BASED DIGITAL IMAGE SYNCHRONIZATION

(71) Applicant: Adobe Inc., San Jose, CA (US)

(72) Inventors: Russell Thomas Williams, San Jose, CA (US); Habib Khalfallah, Bellevue, WA (US); Jan Stoeckmann, Hamburg (DE); Alan Lee Erickson, Highlands Ranch, CO (US)

(73) Assignee: Adobe Inc., San Jose, CA (US)

( * ) Notice: Subject to any disclaimer, the term of this patent is extended or adjusted under 35 U.S.C. 154(b) by 176 days.

(21) Appl. No.: 15/725,730

(22) Filed: Oct. 5, 2017

(65) Prior Publication Data

US 2019/0108665 A1 Apr. 11, 2019

(51) Int. Cl.
| | | |
|---|---|---|
| *G06T 11/60* | (2006.01) | |
| *G06F 16/178* | (2019.01) | |
| *G06F 16/174* | (2019.01) | |
| *H04N 19/119* | (2014.01) | |
| *H04N 19/169* | (2014.01) | |
| *G06T 9/00* | (2006.01) | |

(52) U.S. Cl.
CPC .......... *G06T 11/60* (2013.01); *G06F 16/178* (2019.01); *G06F 16/1744* (2019.01); *G06T 9/00* (2013.01); *H04N 19/119* (2014.11); *H04N 19/169* (2014.11); *G06T 2200/24* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 6,693,635 B1* | 2/2004 | Yokomizo | ............... | G06T 11/60 345/161 |
| 6,697,061 B1* | 2/2004 | Wee | ....................... | H04N 19/61 345/419 |
| 7,194,032 B1* | 3/2007 | Easwar | .................. | H04N 19/48 375/240.12 |
| 8,352,465 B1* | 1/2013 | Jing | ........................ | G06F 16/54 707/723 |
| 2002/0080881 A1* | 6/2002 | Honda | ................. | H04N 19/172 375/240.16 |
| 2004/0205199 A1* | 10/2004 | Gormish | ................. | H04L 29/06 709/229 |
| 2006/0204118 A1* | 9/2006 | Fehmi | ....................... | G06T 5/10 382/248 |

(Continued)

OTHER PUBLICATIONS

"Combined Search and Examination Report", GB Application No. 1806800.7, dated Oct. 12, 2018, 6 pages.

*Primary Examiner* — Kim Y Vu
*Assistant Examiner* — Nathan J Bloom
(74) *Attorney, Agent, or Firm* — SBMC

(57) ABSTRACT

Techniques and systems for component-based digital image synchronization are described. In one example, a digital image is stored as a composite file with a number of separately compressed individual components. Indicators are generated during an editing process of a digital image. The indicators are usable to correlate altered portions of the digital image with compressed components of the composite digital image file. The altered components are then communicated to a synchronization service for synchronization with a remote representation of the digital image file.

20 Claims, 11 Drawing Sheets

(56) References Cited

U.S. PATENT DOCUMENTS

| | | | |
|---|---|---|---|
| 2007/0253640 A1* | 11/2007 | Brett | G06T 11/60 382/276 |
| 2008/0285892 A1 | 11/2008 | Sposato et al. | |
| 2009/0202179 A1* | 8/2009 | Shivanna | G06F 19/321 382/311 |
| 2010/0034473 A1* | 2/2010 | Sadasue | H04N 19/44 382/232 |
| 2012/0194542 A1* | 8/2012 | Matsui | G06F 3/1454 345/619 |
| 2012/0243781 A1* | 9/2012 | Takahashi | H04N 19/46 382/166 |
| 2012/0246114 A1 | 9/2012 | Edmiston et al. | |
| 2017/0213370 A1* | 7/2017 | Lea | G06Q 50/10 |
| 2018/0062852 A1* | 3/2018 | Schmahmann | G06F 16/176 |

\* cited by examiner

COMPONENT-BASED DIGITAL IMAGE SYNCHRONIZATION

BACKGROUND

As computing technology has advanced and computers have become increasingly commonplace, people have come to use their computers in a variety of different manners. One such use is to utilize their computing devices to edit images or other content. While users may enjoy the ability to utilize their computing devices to edit content, such editing is not without its problems. One such problem is that content can sometimes be very large in size. This is particularly troublesome when a computing device performs editing techniques at least partially over a network, such as when the content is stored in the 'cloud' or when the content is synchronized with a copy at an external location.

Accordingly, synchronization techniques have been developed for a computing device to identify portions of content that have been altered from a prior version, and sync only those altered portions to the cloud. By using file comparison techniques such as the "diff utility", files may be compared by a computing device on a character-by-character or line-by-line basis to locate differences. However, this fails to work when the content is compressed, encrypted, or has a complex structure. A small change to user-visible content such as a document may cause major changes to the data of the entire corresponding file and/or cause movement of most of the data within the file. As such, conventional file comparison techniques indicate that the majority of the file has been altered when only a small portion has actually been altered. As a result, conventional techniques may result in synchronization of unchanged content, reducing efficiency, wasting bandwidth, and causing unnecessary delays.

SUMMARY

Techniques and systems for component-based digital image synchronization are described. These techniques are usable by a synchronization module of a computing device (e.g., locally or "in the cloud") to synchronize only altered portions of digital images thereby conserving bandwidth and increasing the efficiency of the computing device.

The computing device, for instance, may utilize indicators generated during the editing of a digital image document to locate specific components of a corresponding compressed digital image file that have been altered. These altered components may be located by the computing device without performing a decompression process and without comparing the components to a prior version, thereby improving operational efficiency and conserving computational, memory, and battery resources of the computing device. The altered components are then communicated by the computing device to a synchronization service for synchronization with a remote representation of the digital image.

Further, a digital image file is stored by a computing device as a composite file with a number of separately compressed individual components. In this way, a change to one component does not affect the compression or data of any other component. Thus, a comparison of compressed components by the computing device is capable of detecting differences on a granular level at a fraction of the computational cost as compared to conventional techniques of compressing and comparing full image files.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
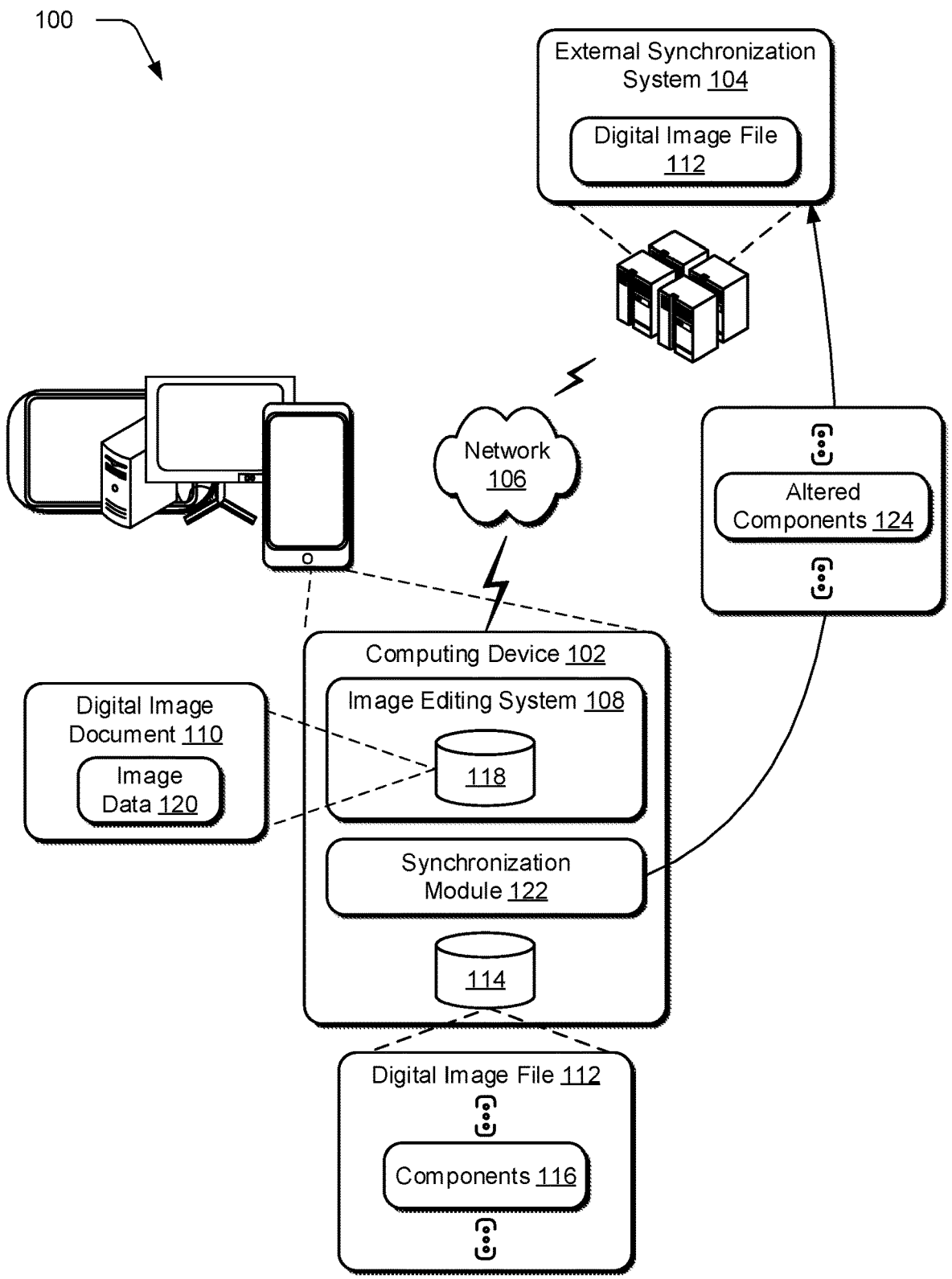
FIG. 1 is an illustration of an environment in an example implementation that is operable to employ component-based digital image synchronization techniques described herein.

Conventional synchronization techniques, in an attempt to reduce the bandwidth requirements of remote synchronization processes, rely on binary comparison techniques to identify differences between corresponding files. However, binary comparison techniques fail or have an excessive computational cost when the content is compressed, encrypted, or has a complex structure. For instance, a small change in the beginning of a file saved in a compressed format may alter the entirety of the compressed data. A binary comparison technique performed on compressed versions of the file may then believe that the entirety of the file has been altered, and a conventional synchronization technique would begin synchronizing the entirety of the file or otherwise have a limited effectiveness with increased computational costs. Thus, conventional synchronization techniques are unable to adequately identify altered portions of compressed files. This is of particular relevance to synchronization of digital image files, as digital image files are rarely stored as raw image data in a non-compressed format.

Additionally, the complex structure of a digital image document can cause small changes in content or simple changes in structure to significantly alter many areas of a corresponding digital image file and cause a conventional synchronization technique to synchronize most or all of the digital image file. For example, a digital image document with a complex structure may include a number of layers. A simple change in the structure of the digital image document such as a re-ordering of the layers significantly alters many areas of the corresponding digital image file.

Accordingly, component-based digital image synchronization techniques and systems are described. In examples described in the following, image files are stored by a computing device as composite files with a number of separately compressed individual components. The individual components, for instance, may correlate to individual layers or channels of a digital image document, rectangular sub-areas making up the individual layers and channels of a digital image, and so forth. It is to be appreciated that the individual components may correspond to any size, shape, type, or granularity and so forth.

The process utilized by the computing device to identify individual components of a digital image file that have been altered may take a variety of forms. In one example, indicators are generated by the computing device during the editing of a digital image document. These indicators reference specific portions of the digital image document that have been altered, and may be utilized to locate specific components of a corresponding digital image file that have been altered. These altered components may be located by the computing device without performing a decompression process and without comparing the components to a prior version, thereby improving operational efficiency and conserving computational, memory, and battery resources of the computing device.

Once altered components have been located, the synchronization module of the computing device forms a communication that includes the altered components. The communication is then communicated to a synchronization service for synchronization with a remote representation of the digital image file. The communication is configured to cause synchronization with a remotely stored instance of the digital image file. The communication may be sent by the computing device, for instance, via the network to an external synchronization system. The communication includes the identified altered components, but does not contain any components that do not correspond to any altered portions of the digital image file. Thus, the communication is configured to cause synchronization of altered components, and to not cause synchronization of unaltered components. In this way, only altered components are communicated, reducing the size of the communication and thereby preserving bandwidth.

Further discussion of these and other examples is included in the following sections and shown in corresponding figures.

In the following discussion, an example environment is first described that may employ the component-based digital image synchronization techniques described herein. Example procedures are also described which may be performed in the example environment as well as other environments. Consequently, performance of the example procedures is not limited to the example environment and the example environment is not limited to performance of the example procedures.

Terminology Examples

Example descriptions of explanations of certain terms as used herein are set forth below. Each term is applicable to one or more, but not necessarily all, implementations that are presented herein. Some terms are further described using one or more examples.

"Composite Representation" refers to a combination of multiple files, including multiple component files (e.g., $component_1, \ldots, component_n$) and a manifest file. The manifest file identifies each of the component files included in the composite representation. The component files can be identified in different manners, such as by including in the manifest file a file name of each of the component files. The multiple component files and the manifest file may be stored, for instance, in a container that is generally considered to be a single 'file', and may be formatted such that it is collectively viewed as a single file by an operating system of a computing device.

"Persistent Memory" refers to any method or apparatus for storing data structures such that they can continue to be accessed using memory instructions or memory APIs even after the end of the process that created or last modified them. Persistent memory capabilities extend beyond non-volatility of stored bits. For instance, loss of metadata that translates virtual addresses into physical addresses can render durable bits non-persistent. "Non-persistent memory" refers to any method or apparatus for storing data structures that is not able to be accessed after the end of the process that last created or modified them.

"Virtual Memory" refers to memory management techniques that map memory addresses used by a program (e.g., virtual addresses) into physical addresses corresponding to actual computer memory. Virtual addresses may exist without being mapped into physical addresses, and/or may be mapped into physical addresses of multiple different physical memories. As an example, an amount of virtual addresses may be assigned that exceeds the amount of physical addresses available to a computing device. In another example, a portion of virtual addresses used by a program may be mapped to a first physical memory device (e.g., RAM), while another portion of virtual addresses used by the same program may be mapped to a second physical memory device (e.g., a disk drive). Additionally, virtual memory may take advantage of distributed computing environments. For example, a computing device may utilize virtual memory techniques to map a virtual address to a physical address of memory contained in another computing device.

"Layers" refer to different levels of a digital image. Multiple individual layers may be stacked or merged, and each layer is individually defined. An individual layer may include transparent areas that allow other layers to be visible through the particular individual layer. Some layers may not themselves contain any apparent content, and instead may affect layers below it. For example, a layer may hold color or tonal adjustments that affect other layers. Rather than directly editing the pixels of a base image, layers may be edited to alter the digital image without changing the pixels of the base image. Types of layers may include, but are not limited to: background layers, pixel layers, adjustment layers, fill layers, vector layers, smart shape layers, type layers, video layers, frame animation layers, 3D layers, embedded smart object layers, linked smart object layers, library linked smart object layers, image stack layers, layer groups, artboard layers, and so on. A particular layer may be further divided into multiple "channels". For example a layer may include color values for pixels according to RGB (red-green-blue) value indicators that represent amounts of each of the three additive primary colors that are used to create a color for one or more pixels. A channel may be created for each type of value, for example a channel for all of the red values in a layer, a channel for all of the green values in the layer, and a channel for all of the blue values in the layer. A particular channel may be further divided into multiple "tiles". A tile represents a rectangular region within the particular channel. For example, a channel containing green values of pixels in a layer may be divided into a number of tiles, such as a tile containing the green values of pixels in a top-left quadrant of a layer and so forth.

"Digital image file" refers to a representation of digital image content in a persistent memory. A digital image file may include any data and/or data structures associated with stored digital image content. For example, a digital image file may be a composite representation of digital image content that includes a number of components.

"Digital image document" refers to a representation of digital image content in a format capable of visibly displaying the digital image content to a user. A digital image document may include, for instance, data and/or data structures in non-persistent memory. For example, a digital image document may include data structured in a number of layers, channels, tiles, and so forth that are readable by an image editing system. A particular digital image document corresponds to one or more digital image files.

Example Environment

FIG. 1 is an illustration of a digital medium environment 100 in an example implementation that is operable to employ component-based digital image synchronization techniques described herein. The illustrated environment 100 includes a computing device 102 and an external synchronization system 104 that are communicatively coupled, one to another, via a network 106, e.g., the Internet. Computing devices that implement the computing device 102 and the external synchronization system 104 may be configured in a variety of ways.

A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as illustrated for the external synchronization system 104 and as further described in relation to FIG. 11.

The digital medium environment 100 is further illustrated as including an image editing system 108, as part of the computing device 102, that is configured to edit a digital image document 110 corresponding to a digital image file 112. The digital image file 112 is illustrated as stored in a storage 114, e.g., a computer-readable storage medium, database, and so forth. The digital image file 112 may be compressed or encoded in any suitable format, e.g., as a JPEG, TIFF, PSD, and so forth.

Further, the digital image file 112 may be stored as a composite representation including a number of individual components 116. The individual components 116 may, for instance, correlate to individual layers or channels of the digital image document 110, rectangular sub-areas making up the individual layers and channels of the digital image document 110, and so forth. It is to be appreciated that the individual components 116 may correspond to any size, type, shape, or granularity and so forth. As an example, the individual components 116 may correspond to an individual geometric shape or pattern, a grouping of individual geometric shapes or patterns, a nested image document, portions of a nested image document, and so forth. A nested document is a document that is placed inside of another document. For example, a nested image document is an image document embedded within a host image document, and the nested image document has its own structure of layers, channels, tiles, and so forth that are different from the structure of the host image document. In such embodiments, a first component may correspond to a tile of the host image document, a second component may correspond to a tile of the nested image document, and so forth.

The image editing system 108 is representative of functionality that allows users to interact with digital image documents, such as by viewing, creating, assembling, editing, compressing, and so forth. Examples of applications that provide functionality which may be included in the digital image editing system 108 include Adobe Photoshop™, Adobe Illustrator™, Adobe InDesign™, and so forth. Further, the image editing system 108 may enable the computer device to interact with digital image documents via the network 106, such as by providing, accessing, and editing the digital image documents e.g., as part of a subscription-based service.

To facilitate the editing of digital image documents, the image editing system 108 may include a suite of tools, such as tools that enable users to create and arrange a variety of objects including points, lines, basic shapes, user-defined shapes, individual pixels, and so forth. The image editing system 108 may also include functionality that allows user to change the attributes of these objects, such as the objects' color, transparency, fill type (e.g., solid, gradient, pattern, texture, and so on), depth relative to other objects (e.g., in front of or behind), whether the objects cast shadows, and so forth. Each of these objects and/or attributes may be associated with a particular layer or channel of a digital image document. In one or more implementations, the image editing system 108 presents a user interface for display that allows a user to select such tools. The user interface also includes a workspace where the user can create or edit digital image documents by leveraging the tools. This portion of the user interface presents objects that are created, arranged, and modified by the user.

The image editing system 108 includes a non-persistent storage functionality 118 for storage of image data 120 associated with the digital image document 110. The non-persistent storage 118 may include, for instance, a virtual memory mechanism, RAM, a temporary storage cache, and so forth that are configured to be accessible during execution of the image editing system 108 as described in greater detail with respect to FIG. 2.

The computing device 102 includes a synchronization module 122. The synchronization module 122 is representative of functionality implemented at least partially in hardware of the computing device 102 to manage synchronization of the digital image file 112 with a representation of the digital image file 112 within the external synchronization system 104. The synchronization module 122 is configured to communicate with the external synchronization system 104 via the network 106. When the synchronization module 122 detects alterations made to the digital image file 112, the synchronization module 122 determines which of the components 116 have been altered and communicates corresponding altered components 124 to the external synchronization system 104. In this way, when the digital image document 110 is edited and the corresponding digital image file 112 is altered 112, only the altered components 124 are communicated to the external synchronization system 104 in order to maintain synchronization. This improves operational efficiency and conserves computational, memory, and battery resources of the computing device 102. Further, bandwidth usage with respect to the network 106 is reduced as unaltered components of the components 116 are not transmitted.

The external synchronization system 104 stores at least one representation of the digital image file 112. The at least one representation of the digital image file 112 may include one or more single-file representations of the digital image file 112, and/or one or more composite representations of the digital image file 112. For instance, the external synchronization system 104 may store multiple different versions of the digital image file 112. The synchronization module 122 and the external synchronization system 104 may utilize techniques such as the Digital Composite Technology ("DCX") framework in order to maintain synchronization of content.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
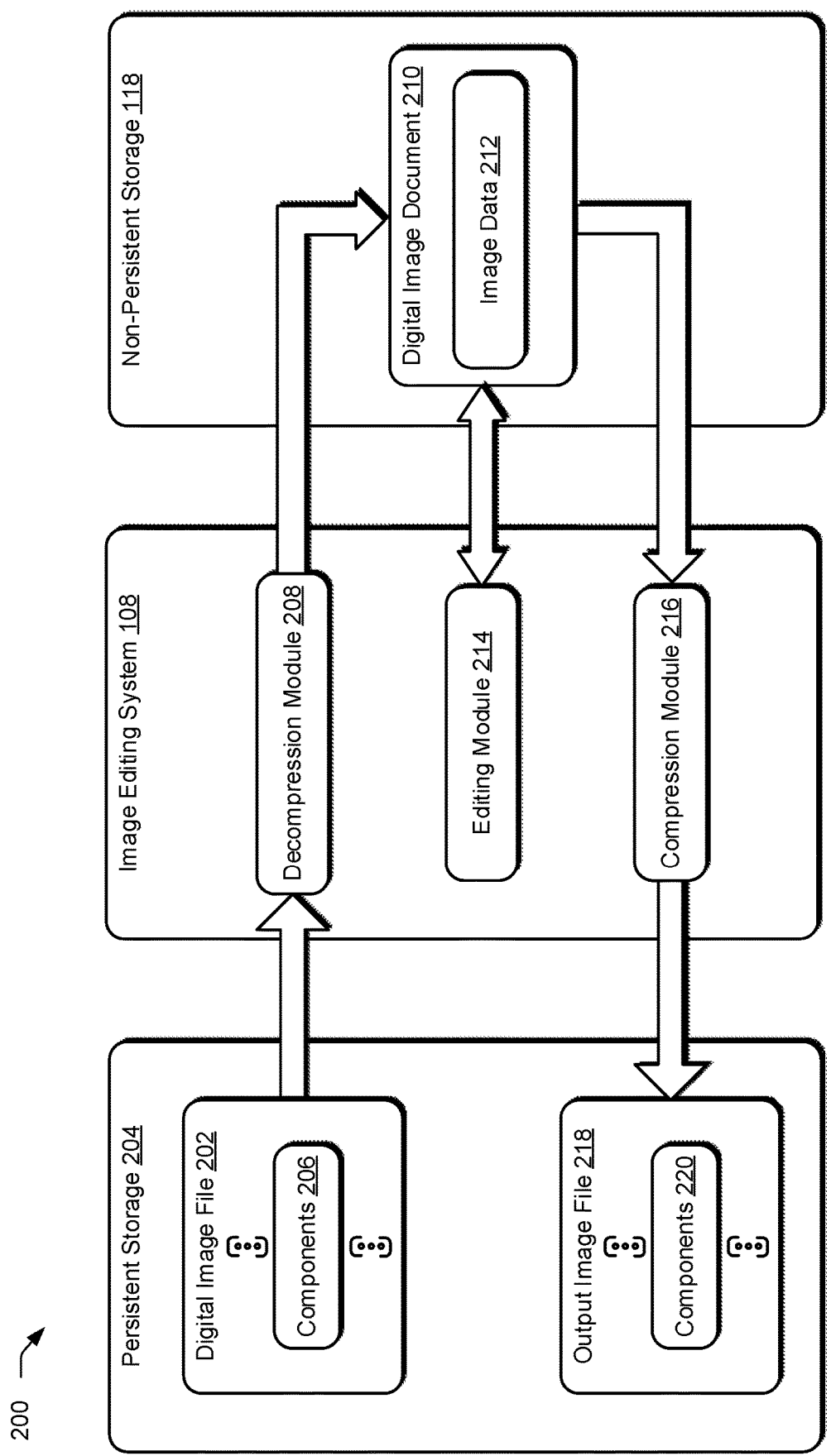
FIG. 2 depicts an example system showing an image processing pipeline of the image editing system of FIG. 1 in greater detail.

FIG. 2 depicts an example system 200 showing an image processing pipeline of the image editing system 108 in greater detail. The image processing pipeline begins with retrieval of a digital image file 202 from a persistent storage 204. The persistent storage 204 may be, for example, the storage 114 of the computing device 102, a storage included as a part of the external synchronization system 104, and so forth. The digital image file 202 is stored as a container that includes a plurality of components 206, although the digital image file 202 may be configured to appear as a single object to an operating system of the computing device 102. The digital image file 202 is stored in a compressed image format. In some implementations, each individual component 206 is stored in a compressed format while the container itself is not compressed.

When the image editing system 108 retrieves the digital image file 202, the digital image file 202 is processed by a decompression module 208. The decompression module 208 is representative of functionality implemented at least partially in hardware of the computing device 102 to decompress and/or convert data of the digital image file 202 into a format readable by the image editing system 108, such as a digital image document 210. Decompressed data associated with the digital image document 210 is stored as image data 212 within the non-persistent storage 118. The non-persistent storage 118 is capable of storing data structures that can be accessed using memory instructions from the image editing system 108. However, the non-persistent storage 118 cannot be accessed after a process that created the data structures has ended. The non-persistent storage 118 may include, for example, a virtual memory mechanism or RAM used for temporary storage of data during the execution of specific processes associated with the image editing system 108.

The image data 212 may be organized or segmented such as according to layers, channels of layers, tiles of channels, and so forth. Types of layers may include, but are not limited to: background layers, pixel layers, adjustment layers, fill layers, vector layers, smart shape layers, type layers, video layers, frame animation layers, 3D layers, embedded smart object layers, linked smart object layers, library linked smart object layers, image stack layers, layer groups, artboard layers, and so on. A particular layer may be further divided into multiple channels. For example a layer may include color values for pixels according to RGB (red-green-blue) value indicators that represent amounts of each of the three additive primary colors that are used to create a color for one or more pixels. A channel may be created for each type of value, for example a channel for all of the red values in a layer, a channel for all of the green values in the layer, and a channel for all of the blue values in the layer. A particular channel may be further divided into multiple tiles. A tile represents a rectangular region within the particular channel. For example, a channel containing green values of pixels in a layer may be divided into a number of tiles, such as a tile containing the green values of pixels in a top-left quadrant of a layer and so forth.

An editing module 214 of the image editing system 108 is representative of functionality implemented at least partially in hardware of the computing device 102 to effectuate alterations to the digital image document 210. The editing module 214 edits the image data 212 within the non-persistent storage 118 responsive to inputs defining edits to the digital image document 210.

When the image editing system 108 receives an input to initiate storing of the digital image document 210 (e.g., to 'save' the document), the image data 212 is processed by a compression module 216. The compression module 216 is representative of functionality implemented at least partially in hardware of the computing device 102 to compress and/or convert the image data 212 into an output image file 218 suitably formatted for storage in the persistent storage 204 and/or for communication via the network 106. In this way, the size of the output image file 218 is minimized when stored in the persistent storage 204, while still allowing the image editing system 108 to access and edit uncompressed data via the non-persistent storage 118.

Figure 3:
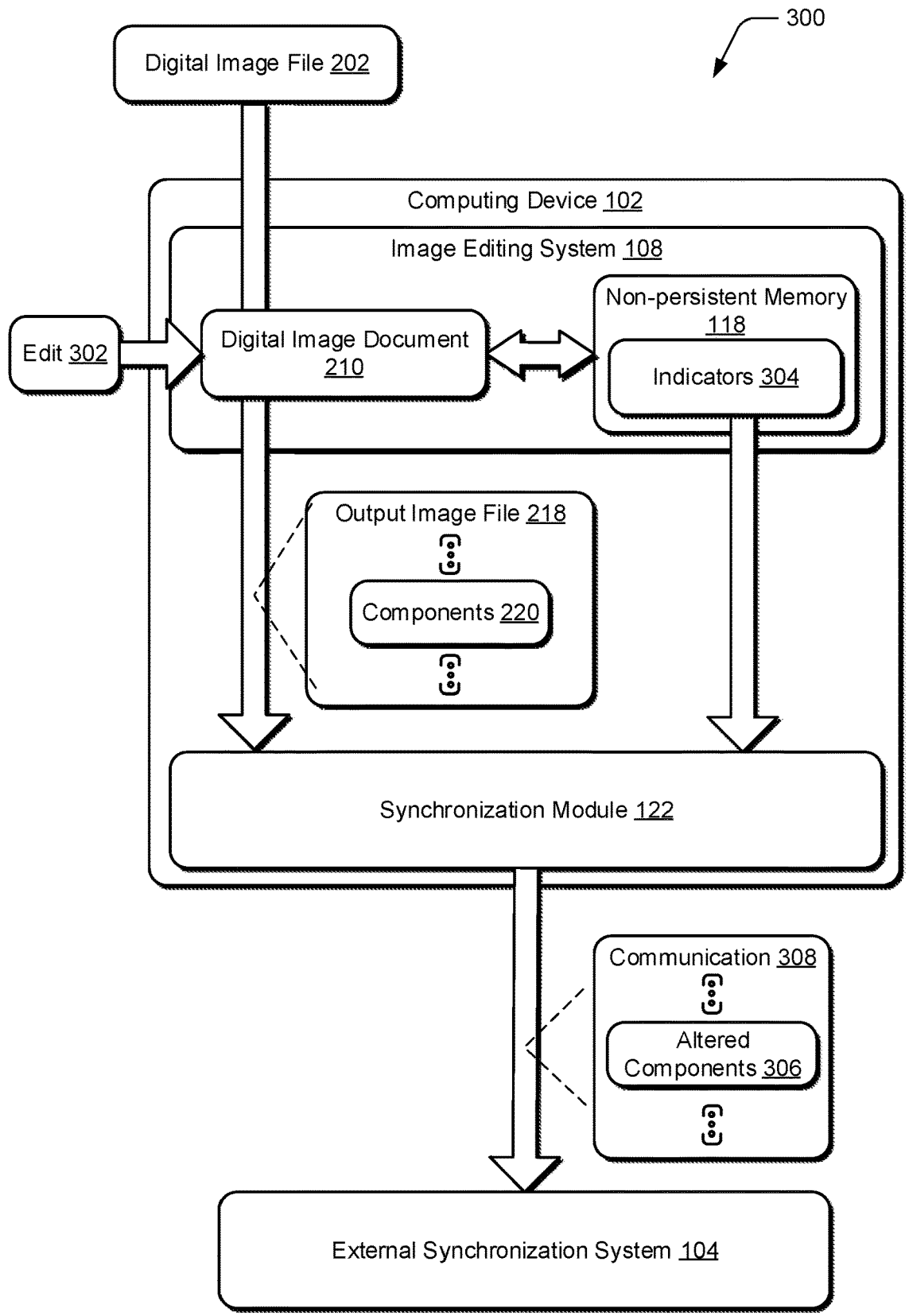
FIG. 3 depicts an example system showing an example synchronization processing pipeline.

FIG. 3 depicts a system 300 showing an example synchronization processing pipeline. The synchronization processing pipeline begins with an input digital image file 202 becoming processed by the image editing system 108 of the computing device 102 as described with respect to FIG. 2. The digital image file 202 is converted by the image editing system 108 into a digital image document 210 and stored in the non-persistent storage 118. As the image editing system 108 receives input defining edits 302 to the digital image document 210, the image editing system 108 alters the digital image document 210 to effectuate the edits.

The image editing system 108 may segment or organize data associated with the digital image document 210 into small pieces. For instance, the image editing system 108 may organize the digital image document 210 in the non-persistent storage 118 according to layers, channels of layers, or tiles of channels. Further, the image editing system may store changes according to these pieces. For example, a change to a single pixel may be reflected as changes to tiles associated with the pixel. When changes are made to the digital image document 210, the image editing system creates indicators 304 that reference the portions of the digital image document 210 that are changed. For instance, whenever a change is associated with a tile, an indicator may be generated referencing that particular tile.

As an example, the image editing system 108 may utilize a virtual memory functionality to assign a virtual memory reference to each tile of the digital image document 210. However, in this example the image editing system 108 does not assign physical memory to a virtual memory reference until a change is made to the virtual memory. In this way, the image editing system 108 my monitor any connections made from the virtual memory to the physical memory, and may utilize these connections to create the indicators 304.

When the image editing system 108 receives an input to initiate storing of the digital image document 210, the image data 212 associated with the digital image document 210 is converted into the output image file 218 including the components 220. Further, the image editing system 108 exports the indicators 304 to the synchronization module 122.

The synchronization module 122 is illustrated as receiving both the output image file 218 and the indicators 304. The synchronization module 122 correlates the indicators 304 as corresponding to particular ones of the components 220. Based on this correlation, the indicators 304 are used to identify particular components as being altered components 306. By virtue of the received indicators 304, the synchronization module 122 may determine the altered components 306 without performing any comparison between the digital image file 202 and the output image file 218. In this way, altered components may be identified without requiring a direct comparison of components. This improves operational efficiency and conserves computational, memory, and battery resources of the computing device 102.

The synchronization module 122 forms a communication 308 that includes the altered components 306, and transmits the communication 308 to the external synchronization system 104 via the network 106. The communication 308 is configured to cause synchronization with a remotely stored instance of the digital image file 202 in the external synchronization system 104. The communication 308 does not include any of the components 220 that are not the altered components 306. In this way, only altered components are communicated to the external synchronization system 104, reducing the size of the communication 308 and thereby preserving bandwidth.

Further, the external synchronization system 104 is configured to only synchronize components corresponding to the altered components 306 in a received communication 308, and thus a synchronization process is not performed for components 220 that do not correspond to the altered components 306. This improves operational efficiency and conserves computational, memory, and battery resources of the external synchronization system 104.

In some implementations, the communication 308 further includes an updated manifest. During the synchronization process, the external synchronization system 104 will maintain both the original components of the digital image file 202 as well as the altered components 306. The external synchronization system 104 does not synchronize the manifest until after all altered components 306 have been synchronized. In this way, a user attempting to access the digital image file 202 from the external synchronization system 104 during a synchronization process will receive the original manifest and the original components, and will not receive an updated manifest without all of the updated components.

Figure 4:
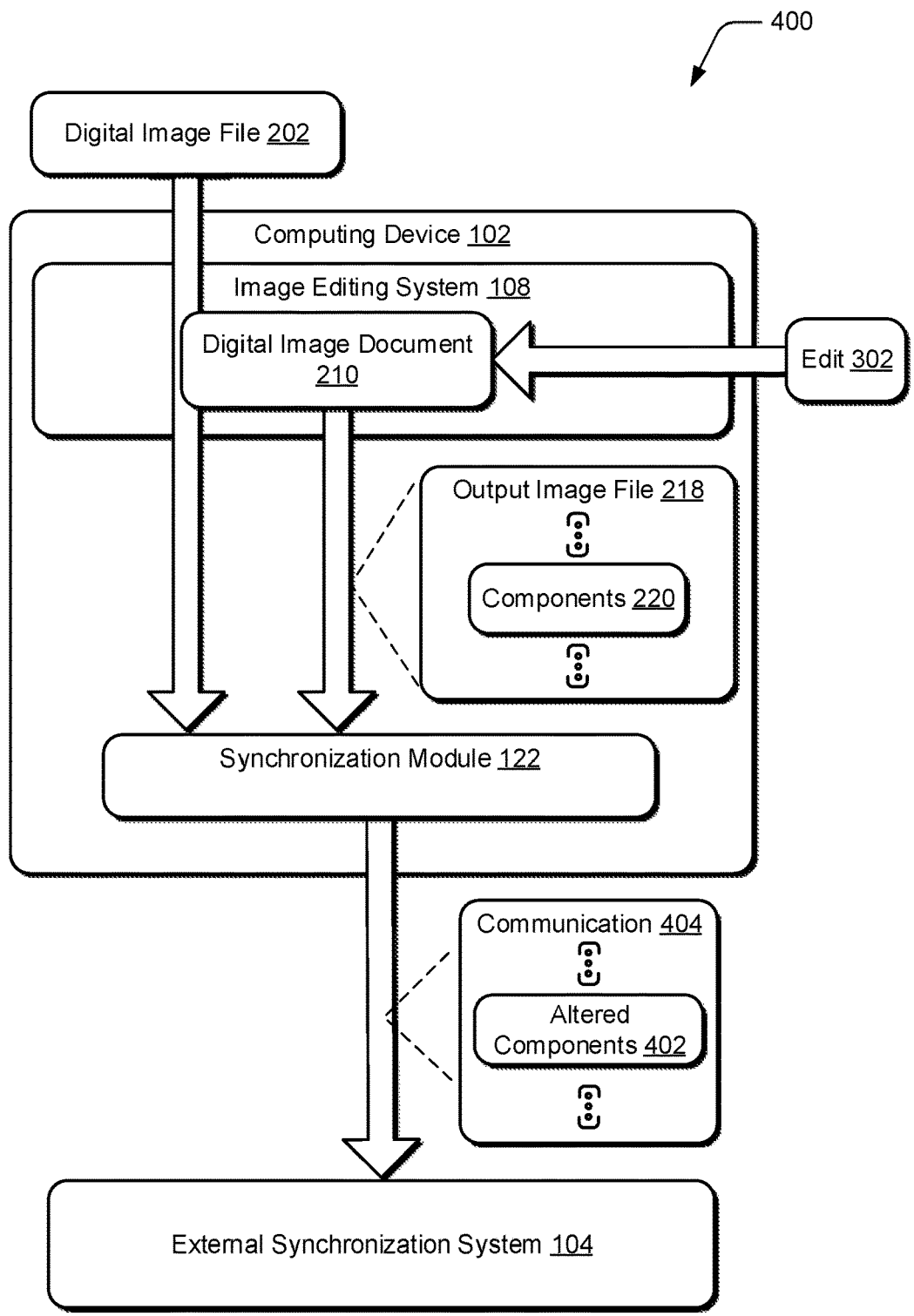
FIG. 4 depicts an example system showing an example synchronization processing pipeline.

FIG. 4 depicts a system 400 showing an example synchronization processing pipeline. The synchronization processing pipeline begins with an input digital image file 202 becoming processed by the image editing system 108 of the computing device 102 as described with respect to FIG. 2. The digital image document 210 is edited by the image editing system 108, and the image editing system 108 outputs the output image file 218, including a plurality of compressed components 220, to the synchronization module 122. In some implementations, each individual component 220 is compressed separately, while the container of the output image 218 is not compressed itself.

The synchronization module 122 receives the digital image file 202 and the output image file 218. The synchronization module 122 is configured to detect differences between the digital image file 202 and the output image file 218. In some implementations, the differences are detected by utilizing indicators as described with respect to FIG. 3. However, any suitable method may be utilized to identify edited portions of the digital image document, such as by the local synchronization module 122 performing a binary comparison technique upon the digital image file 202 and the output image file 218. In such an example, the synchronization module 122 compares individual components of the digital image file 202 with corresponding individual components of the output image file 218. This comparison may be performed for instance by a binary, character, or line comparison technique upon corresponding components of the digital image file 202 and the output image file 218. As the digital image file 202 and the output image file 218 are each stored as a plurality of components, a change to one component does not affect the compression or data of any other component. This allows data comparisons between compressed components to be performed at a greater level of granularity and with a cheaper computation cost as compared to conventional techniques.

Upon identifying altered components 402, the synchronization module 122 forms a communication 404 that is transmitted to the external synchronization system 104, including the altered components 402. The communication 404 is configured to cause synchronization with a remotely stored instance of the digital image file 202 in the external synchronization system 104. The communication 404 does not include any of the components 220 that are not the altered components 402. In this way, only altered components are communicated to the external synchronization system 104, reducing the size of the communication 404 and thereby preserving bandwidth.

Further, the external synchronization system 104 is configured to only synchronize components corresponding to the altered components 402 in a received communication 404, and thus a synchronization process is not performed for components 220 that do not correspond to the altered components 402. This improves operational efficiency and conserves computational, memory, and battery resources of the external synchronization system 104.

In some implementations, the communication 404 further includes an updated manifest. During the synchronization process, the external synchronization system 104 will maintain both the original components of the digital image file 202 as well as the altered components 402. The external synchronization system 104 does not synchronize the manifest until after all altered components 402 have been synchronized. In this way, a user attempting to access the digital image file 202 from the external synchronization system 104 during a synchronization process will receive the original manifest and the original components, and will not receive an updated manifest without all of the corresponding updated components.

Figure 5:
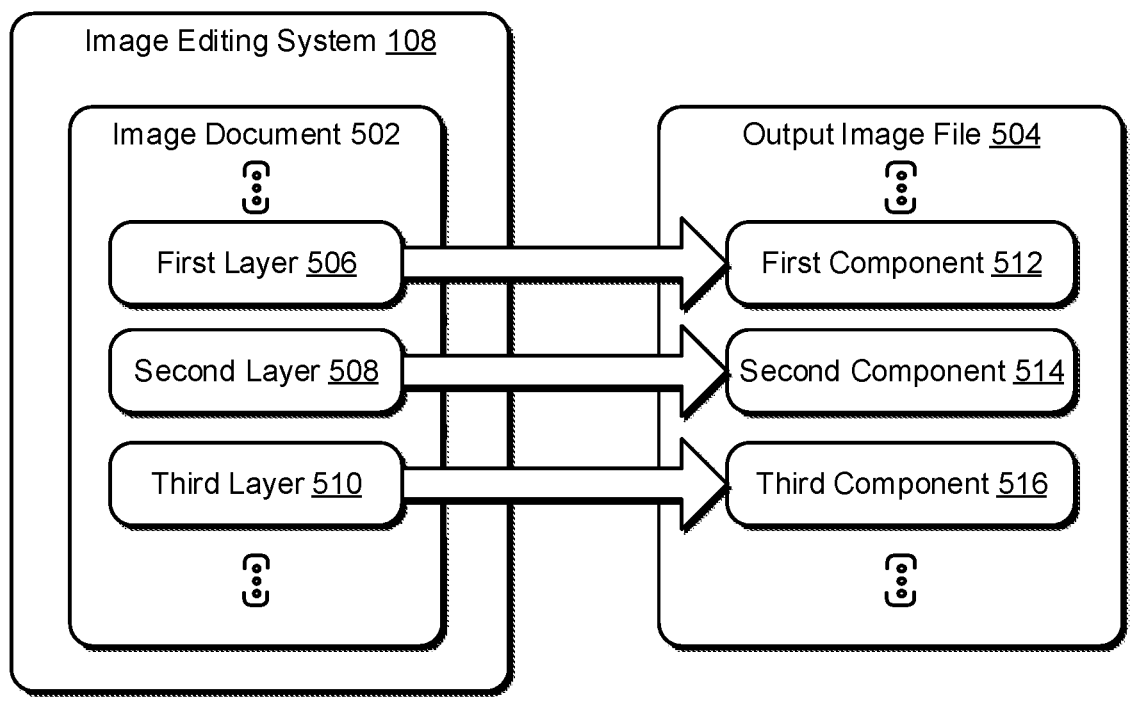
FIG. 5 depicts an example implementation in which separate layers of an image document are stored as separate components of an image file.

FIG. 5 depicts an example implementation 500 in which an image document 502 in an image editing system 108 is converted into an output image file 504. The image document 502 includes uncompressed data, and may include for example the image data 120 in the non-persistent storage 118 of FIG. 1. The image document 502 includes data segmented according to layers, including data corresponding to a first layer 506, a second layer 508, and a third layer 510.

The image document 502 may converted into the output image file 504, for example, by the compression module 216 of FIG. 2. The output image file 504 is a composite representation, and is a container including a number of individual components. A composite representation is a combination of multiple files, including multiple component files (e.g., component$_1$, . . . , component$_n$) and a manifest file. The manifest file identifies each of the component files included in the composite representation. The component files can be identified in different manners, such as by including in the manifest file a file name of each of the component files.

Data corresponding to the first layer 506 of the image document 502 is converted into a first component 512 of the output image file 504. Data corresponding to the second layer 508 of the image document 502 is converted into a second component 514 of the output image file 504. Data corresponding to the third layer 506 of the image document 502 is converted into a third component 516 of the output image file 504. Each of the first component 512, the second component 514, and the third component 516 may be compressed, encoded, and/or encrypted separately. In this way, the output image file becomes a composite representation that includes a number of separate components corresponding to layers in a corresponding digital image document. By compressing each component separately, a change to one component does not affect the compression or data of any other component. This allows data comparisons between compressed components to be performed at a greater level of granularity and with a cheaper computational cost as compared to conventional techniques.

Figure 6:
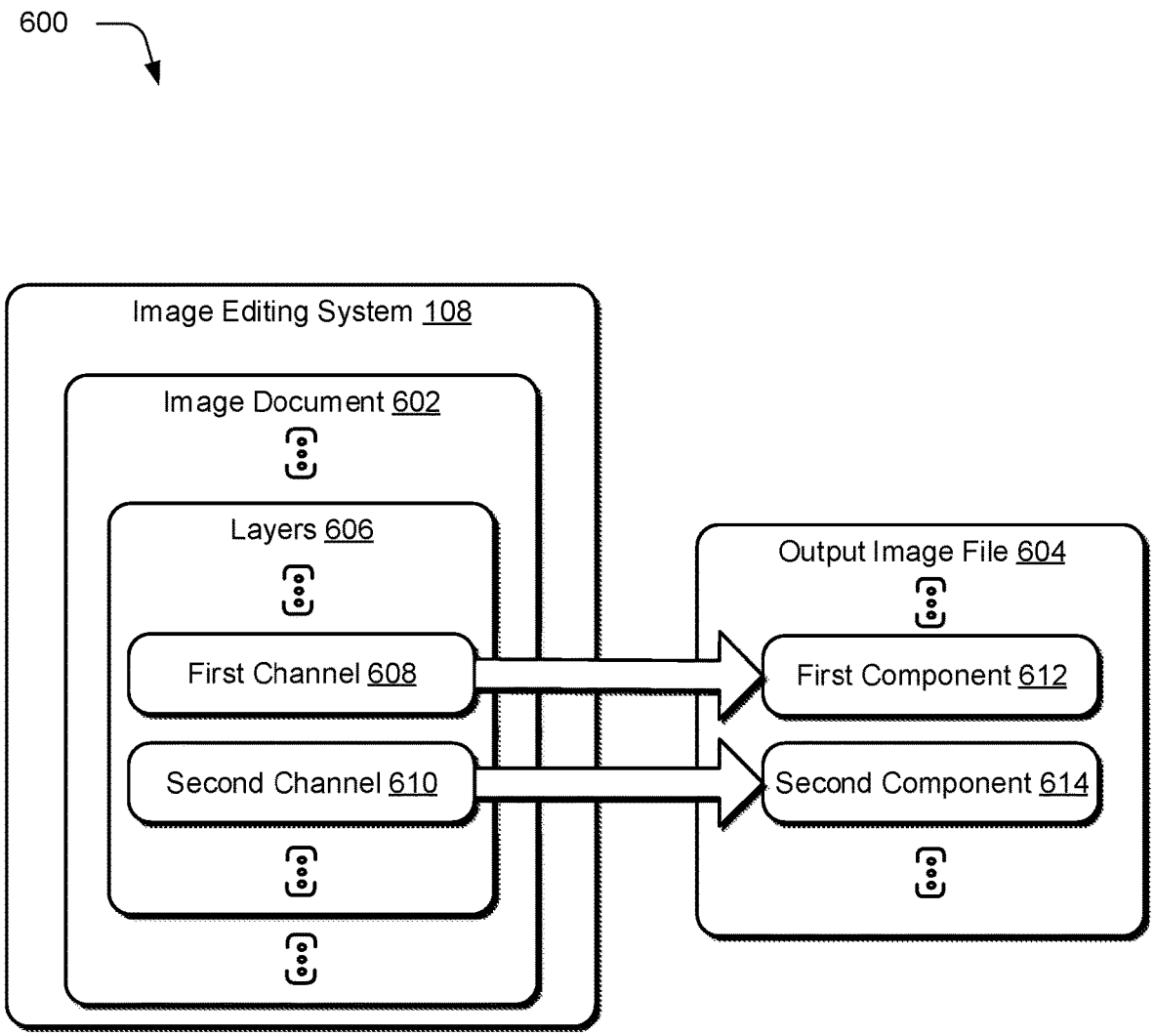
FIG. 6 depicts an example implementation in which separate channels of an image document are stored as separate components of an image file.

FIG. 6 depicts an example implementation 600 in which an image document 602 in an image editing system 108 is converted into an output image file 604. The image document 602 includes uncompressed data, and may include for example the image data 120 in the non-persistent storage 118 of FIG. 1. The image document 602 includes data segmented according to layers, including a layer 606. Each layer includes data further segmented into a number of channels. The layer 606 includes a first channel 608 and a second channel 610.

The image document 602 may converted into the output image file 604, for example, by the compression module 216 of FIG. 2. The output image file 604 is a composite representation, and is a container including a number of individual components. A composite representation is a combination of multiple files, including multiple component files (e.g. component$_1$, . . . , component$_n$) and a manifest file. The manifest file identifies each of the component files included in the composite representation. The component files can be identified in different manners, such as by including in the manifest file a file name of each of the component files.

Data corresponding to the first channel 608 of the layer 606 of the image document 602 is converted into a first component 612 of the output image file 604. Data corresponding to the second channel 610 of the layer 606 of the image document 602 is converted into a second component 614 of the output image file 604. The first component 612 and the second component 614 may each be compressed, encoded, and/or encrypted separately. In this way, the output image file becomes a composite representation that includes a number of separate components corresponding to channels of layers in a corresponding digital image document. By compressing each component separately, a change to one component does not affect the compression or data of any other component. This allows data comparisons between compressed components to be performed at a greater level of granularity and with a cheaper computational cost as compared to conventional techniques.

Figure 7:
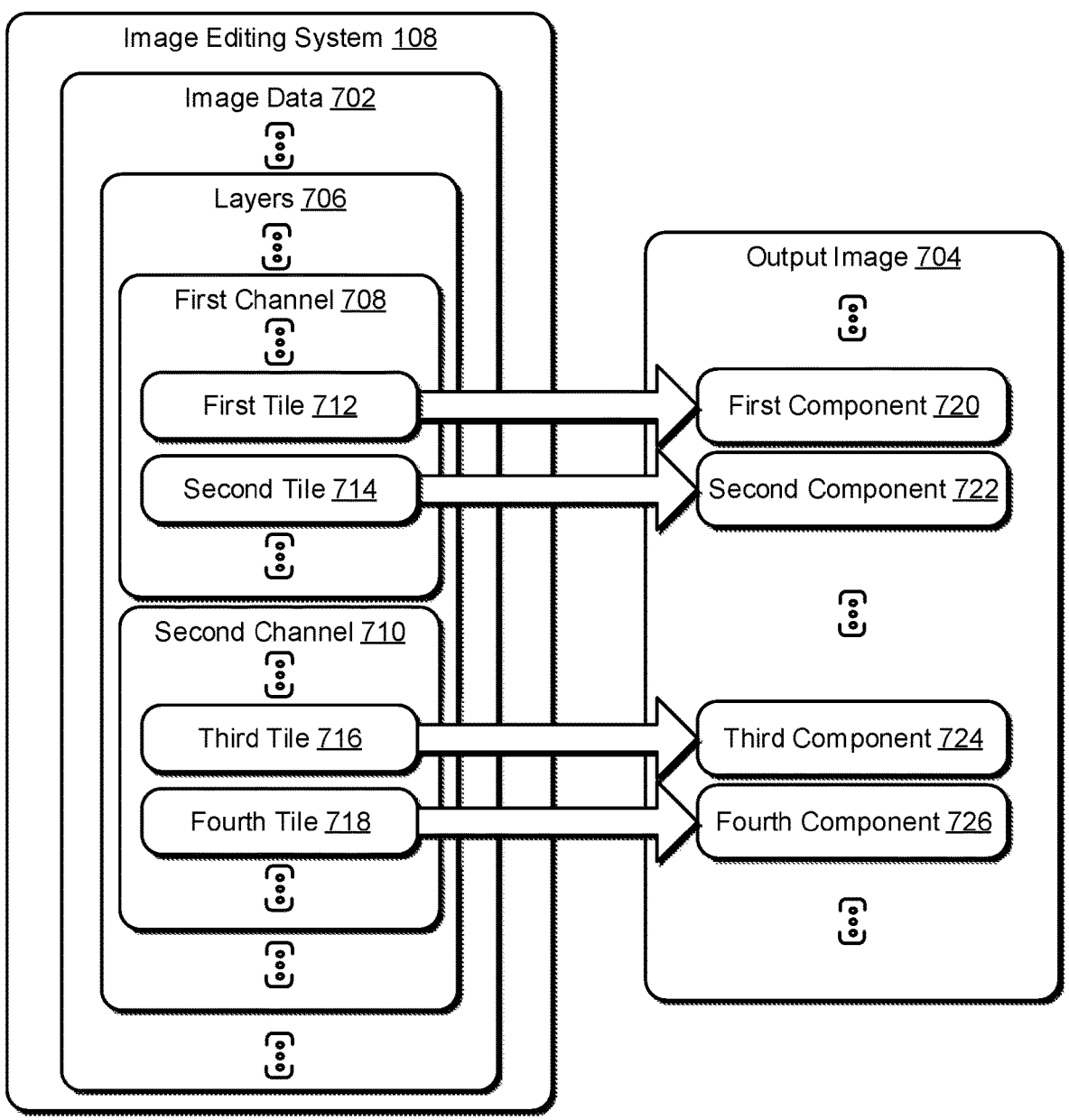
FIG. 7 depicts an example implementation in which separate tiles of an image document are stored as separate components of an image file.

FIG. 7 depicts an example implementation 700 in which an image document 702 in an image editing system 108 is converted into an output image file 704. The image document 702 includes uncompressed data, and may include for example the image data 120 in the non-persistent storage 118 of FIG. 1. The image document 702 includes data segmented according to layers, including a layer 706. Each layer includes data further segmented into a number of channels. The layer 706 includes at least a first channel 708 and a second channel 710. Each channel includes data further segmented into a number of tiles. The first channel 708 includes at least a first tile 712 and a second tile 714. The second channel 710 includes at least a third tile 716 and a fourth tile 718.

The image document 702 may converted into the output image file 704, for example, by the compression module 216 of FIG. 2. The output image file 704 is a composite representation, and is a container including a number of individual components. A composite representation is a combination of multiple files, including multiple component files (e.g. component$_1$, . . . , component$_n$) and a manifest file. The manifest file identifies each of the component files included in the composite representation. The component files can be identified in different manners, such as by including in the manifest file a file name of each of the component files.

Data corresponding to the first tile 712 of the first channel 708 of the layer 706 of the image document 702 is converted into a first component 720 of the output image file 704. Data corresponding to the second tile 714 of the first channel 708 of the layer 706 of the image document 702 is converted into a second component 722 of the output image file 704. Data corresponding to the third tile 716 of the second channel 710 of the layer 706 of the image document 702 is converted into a third component 724 of the output image file 704. Data corresponding to the fourth tile 718 of the second channel 710 of the layer 706 of the image document 702 is converted into a fourth component 726 of the output image file 704. The components 720-726 may each be compressed, encoded, and/or encrypted separately. In this way, the output image file becomes a composite representation that includes a number of separate components corresponding to tiles of channels of layers in a corresponding digital image document. By compressing each component separately, a change to one component does not affect the compression or data of any other component. This allows data comparisons between compressed components to be performed at a greater level of granularity and with a cheaper computation cost as compared to conventional techniques.

It is to be appreciated that any suitable segmentation of the image document 702 may be utilized to form the various components of the output image file 704. For instance, components of the output image file 704 may be created corresponding to a scope greater or less than that of the illustrated tiles 712-718. In some implementations, the various components of the output image file 704 are not consistent in scope. For example, the first component 720 could include data corresponding to specific tile of a specific channel of a specific layer of an image document, while the second component 722 could include the data corresponding to multiple different layers of the image document. In this way, components may be created such as to maintain relatively consistent sizing, by breaking large layers into a number of smaller components, by combining a number of small layers into a single larger component, and so forth.

Example Procedure

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-7.

Figure 8:
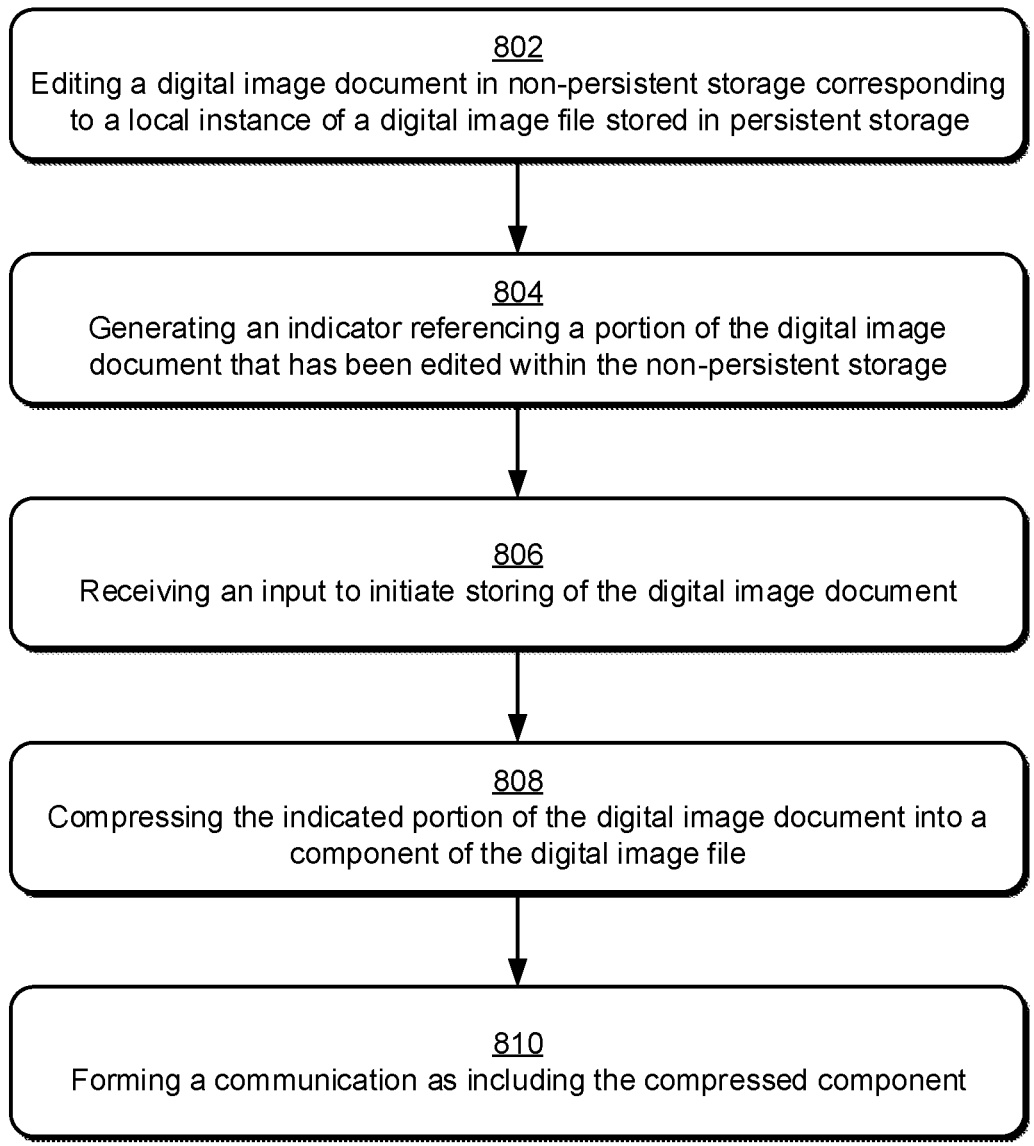
FIG. 8 is a flow diagram depicting a procedure in an example implementation in which an indicator is used to form a communication including an altered component.

FIG. 8 depicts a procedure 800 in an example implementation of component-based digital image synchronization. A local instance of a digital image file is stored in a non-persistent storage. A digital image document corresponding to the local instance of the digital image file is edited within the non-persistent storage (block 802). This may involve, for instance, a digital image file (such as a JPEG, TIFF, PSD, etc.) being opened in a digital image editing application (e.g., Adobe Photoshop™) as a digital image document. The digital image editing application may be, for instance, the image editing system 108 of FIG. 1. As described in relation to FIG. 2, this may initiate performance of an image processing pipeline, including for instance, decompressing data associated with the digital image file into a non-persistent storage, receiving user inputs to edit the digital image document, and altering the digital image document in the non-persistent storage in accordance with the user inputs.

An indicator is generated that references a portion of the digital image document that has been edited (block 804). The indicator may be generated, for instance, by the image editing system 108 of FIG. 1. This may involve monitoring the non-persistent storage for changes in the individual layers, channels, and tiles of decompressed data as described with respect to FIG. 3. Upon determining that a change has been made to the decompressed data, a particular portion of the decompressed data is identified as containing the change and an indicator is generated referencing the particular portion.

An input is received to initiate storing of the digital image document (block 806). This may be, for instance, an explicit user input received to initiate a 'save' function within the image editing system 108. In other implementations, the input may be an 'auto-save' function that causes data to be automatically periodically saved or stored.

To store the digital image document, portions of the digital image document are compressed into separate components of a composite digital image file. For example, each layer, channel, or tile of a digital image document may be separately compressed into individual components of a composite digital image file representing the digital image document. The particular portion of the decompressed data that is indicated by the indicator is compressed into a component of the digital image file (block 808). The particular portion may be compressed into an individual component, or may be combined with other portions and compressed into a larger component. For example, the particular portion may be a tile of a channel of the digital image document, while the component may include data corresponding to the entire associated channel of the digital image document.

A communication is formed that includes the compressed component (block 810). The communication is configured to cause synchronization with a remotely stored instance of the digital image file. The communication may be sent, for instance, via the network 106 to the external synchronization system 104. The communication includes the compressed component corresponding to the edited portions of the digital image document, but does not contain any components that do not correspond to any edited portions of the digital image document. Thus, the communication is configured to cause synchronization of altered components, and to not cause synchronization of unaltered components. In this way, only altered components are communicated to the external synchronization system 104, reducing the size of the communication and thereby preserving bandwidth.

Forming the communication may include determining which components are associated with an indicator. For instance, the synchronization module 122 of FIG. 1 may receive one or more indicators of altered portions of the digital image document in addition to receiving each compressed component of the digital image file. However, not every compressed component corresponds to portions of the image data that have been altered. Thus, the one or more indicators are correlated with particular compressed components. Through this correlation, altered components may be identified without requiring a direct comparison of components. This improves operational efficiency and conserves computational, memory, and battery resources of the computing device 102.

Figure 9:
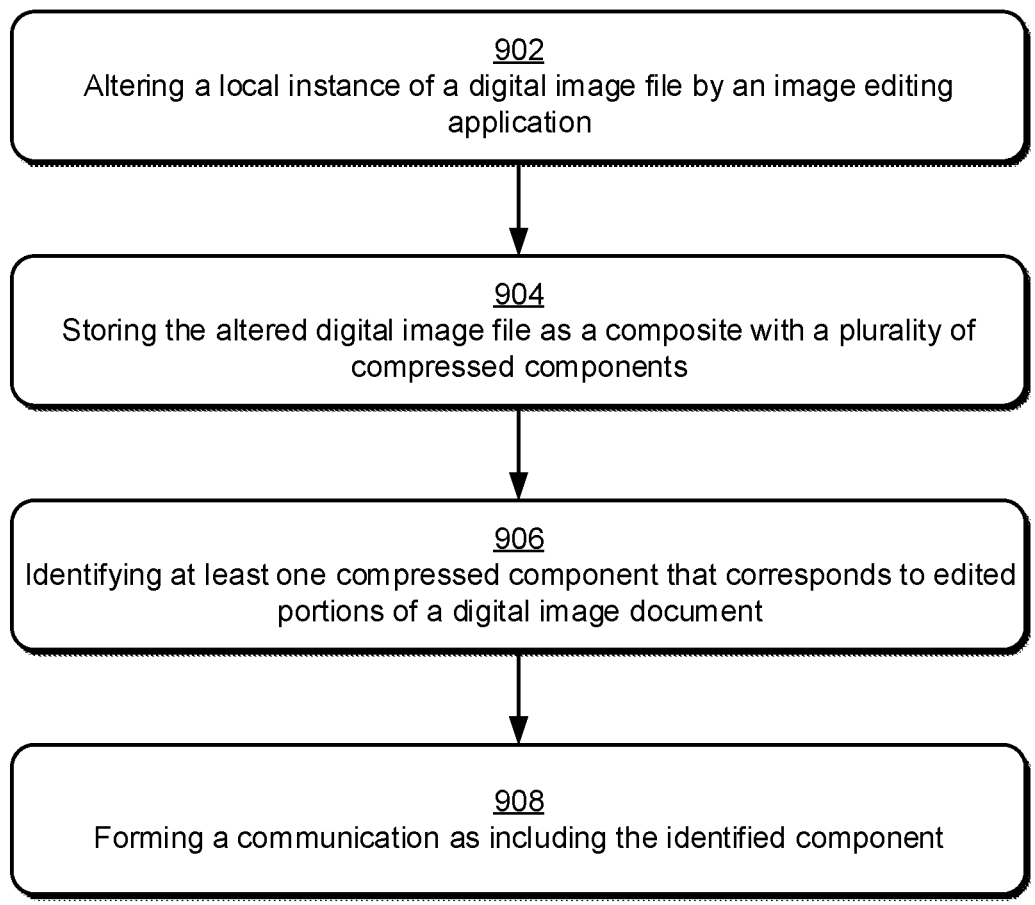
FIG. 9 is a flow diagram depicting a procedure in an example implementation in which a compressed component of a digital image file is identified as including altered portions and used to form a communication included an altered component.

FIG. 9 depicts a procedure 900 in an example implementation of component-based digital image synchronization. A local instance of a digital image file is altered by an image editing application (block 902). The image editing application may be, for instance, the image editing system 108 of FIG. 1. As described in relation to FIG. 2, this may initiate performance of an image processing pipeline, including for instance, decompressing data associated with the digital image file into a non-persistent storage, receiving user inputs to edit the digital image document, and altering the digital image document in the non-persistent storage in accordance with the user inputs.

The edited image file is stored as a composite representation including a plurality of compressed components (block 904). To store the digital image document, portions of the digital image document are compressed into separate components of a composite digital image file. For example, each layer, channel, or tile of a digital image document may be separately compressed into individual components of an associated composite digital image file representing the digital image document.

At least one compressed component is identified as corresponding to edited portions of the digital image document (block 906). This may include receiving an indicator that identifies a particular portion of the digital image document. This indicator may be received from the image editing system 108 of FIG. 1, and may be generated for instance as described with respect to block 804 of FIG. 4. However, any suitable method may be utilized to identify edited portions of the digital image document, such as by comparing the plurality of compressed components to respective portions of the original input digital image file. In such an example, any components that include portions that do not match the corresponding portions of the input digital image file are identified as being altered components.

A communication is formed that includes the identified altered components (block 908). The communication is configured to cause synchronization with a remotely stored instance of the digital image file. The communication may be sent, for instance, via the network 106 to the external synchronization system 104. The communication may include the identified altered components, but does not contain any components that do not correspond to any edited portions of the digital image document. Thus, the communication is configured to cause synchronization of altered components, and to not cause synchronization of unaltered components. In this way, only altered components are communicated to the external synchronization system 104, reducing the size of the communication and thereby preserving bandwidth.

Figure 10:
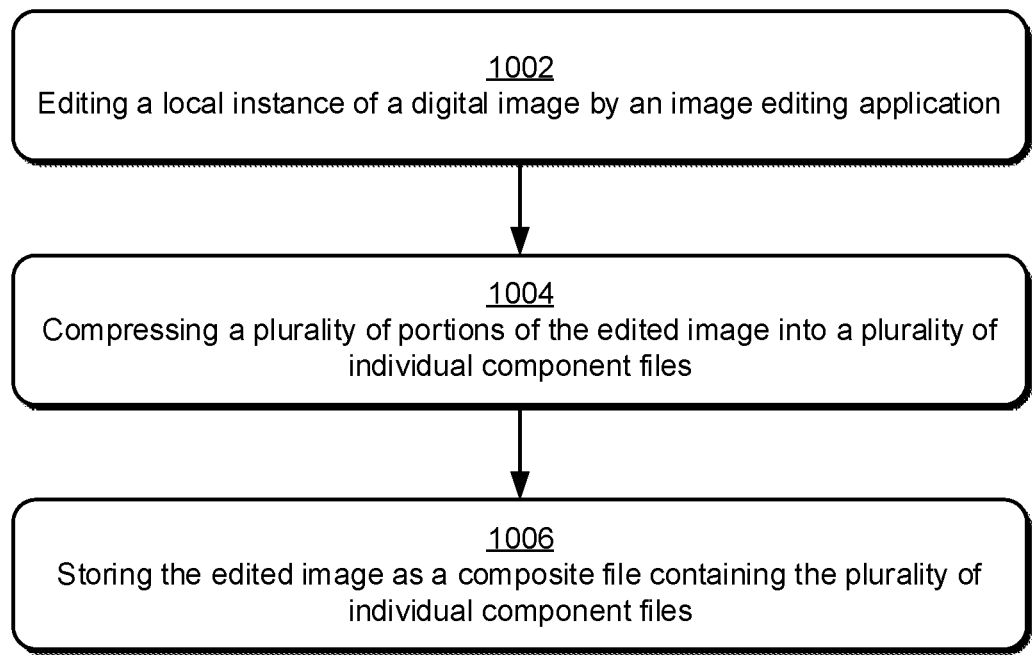
FIG. 10 is a flow diagram depicting a procedure in an example implementation in which a digital image document is edited and stored as a composite digital image file containing component files.

FIG. 10 depicts a procedure 1000 in an example implementation of component-based digital image synchronization. A local instance of a digital image file is altered by an image editing application (block 1002). The image editing application may be, for instance, the image editing system 108 of FIG. 1. As described in relation to FIG. 2, this may initiate performance of an image processing pipeline, including for instance, decompressing data associated with the digital image file into a digital image document in a non-persistent storage, receiving user inputs to edit the digital image document, and altering the decompressed data in the non-persistent storage in accordance with the user inputs.

A plurality of portions of the edited digital image document are compressed into a plurality of individual component files of a digital image file (block 1004). For example, each layer, channel, or tile of a digital image document may be separately compressed into individual components of a digital image file. The edited image is stored as a composite digital image file containing the plurality of individual component files (block 1006). A composite representation is a combination of multiple files, including multiple component files (e.g., component$_1$, . . . , component$_n$) and a manifest file. The manifest file identifies each of the component files included in the composite representation. The component files can be identified in different manners, such as by including in the manifest file a file name of each of the component files. The multiple component files and the manifest file may be stored, for instance, in a container that is generally considered to be a single 'file', and may be formatted such that it is collectively viewed as a single file by an operating system of the computing device 102.

Having discussed some example procedures, consider now a discussion of an example system and device in accordance with one or more implementations.

Example System and Device

Figure 11:
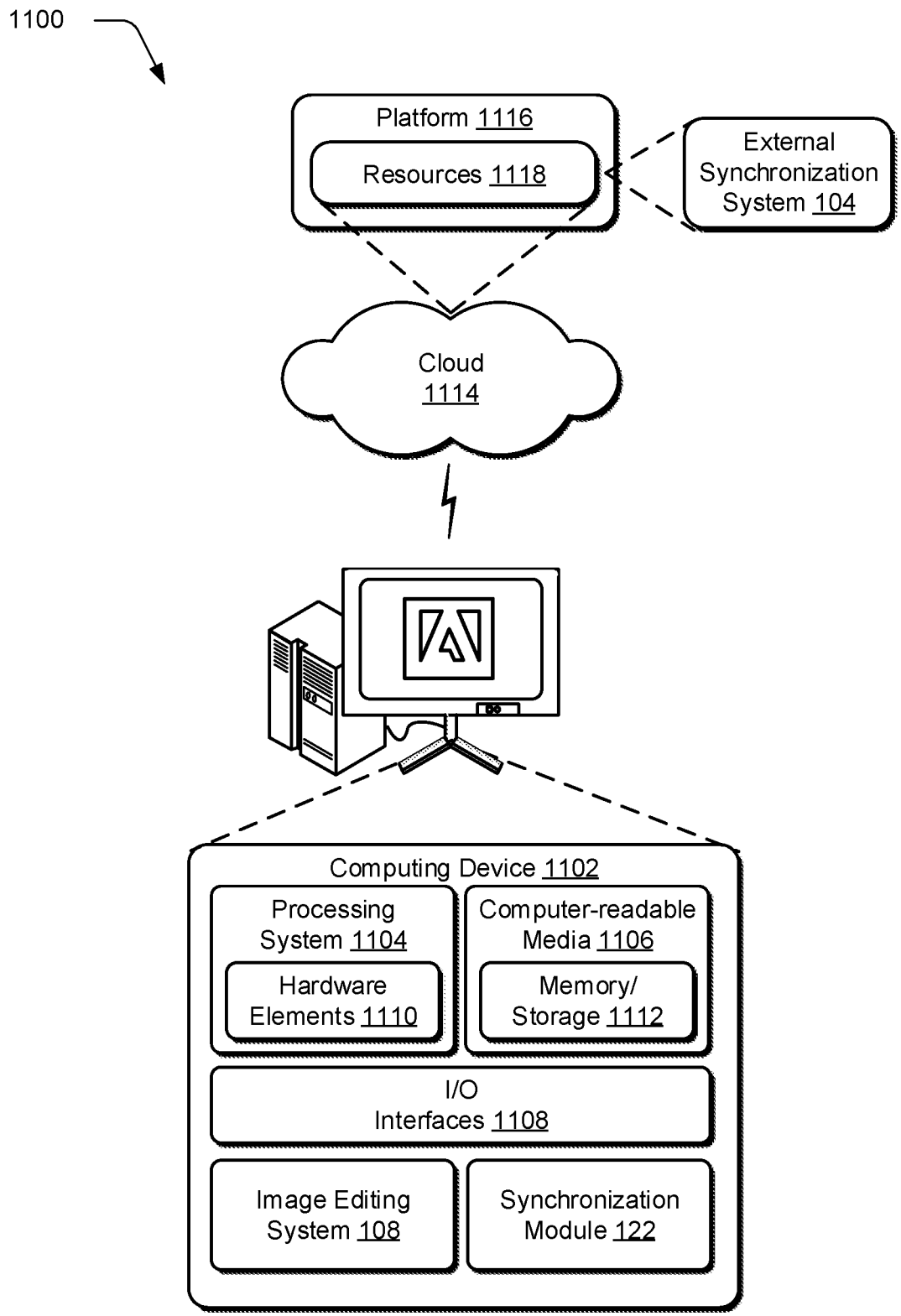
FIG. 11 illustrates an example system including various components of an example device that can be implemented as any type of computing device as described and/or utilized with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the image editing system 108 and the synchronization module 122. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. In a digital medium environment for digital image synchronization and storage, a method implemented by a computing device, the method comprising:
  editing, by the computing device, a digital image document by an image editing application, the digital image document stored in non-persistent storage of the com- puting device and corresponding to a local instance of a digital image file stored in persistent storage of the computing device;

generating, by the computing device, an indicator referencing a portion of the digital image document that has been edited within the non-persistent storage;

receiving, by the computing device, an input to initiate storing of the digital image document;

compressing, by the computing device in response to the input, the indicated portion of the digital image document into a component of a plurality of components of the digital image file; and forming, by the computing device, a communication as including the compressed component and as not including at least one other component of the plurality of components that does not correspond to the portion of the digital image document that has been edited, the communication configured to cause synchronization of the compressed component with a remotely stored instance of the digital image file.

2. The method of claim 1, wherein the communication does not cause synchronization of the at least one other component with the remotely stored instance of the digital image file.

3. The method of claim 1, wherein the non-persistent storage is a virtual memory mechanism.

4. The method of claim 1, wherein each portion is one of a layer, a channel, or a tile of the digital image document.

5. The method of claim 1, wherein the editing by an image editing application comprises:
retrieving an instance of the digital image file;
decompressing data associated with the instance of the digital image file;
storing the decompressed data as the digital image document in the non-persistent storage;
receiving a user input to edit the digital image document; and
editing the decompressed data in accordance with the user input.

6. The method of claim 1, wherein the generating an indicator comprises:
monitoring the non-persistent storage for changes in the digital image document;
determining at least one change made to the digital image document;
associating the at least one change with a portion of the digital image document; and
generating an indicator referencing the portion.

7. The method of claim 6, further comprising:
communicating the indicator from the image editing application to a synchronization module of the at least one computing device; and
determining that the portion of the digital image document referenced by the indicator is associated with the component of the digital image file, and wherein the forming is performed by the synchronization module.

8. The method of claim 1, wherein the compressing comprises compressing each component of the plurality of components of the digital image file.

9. The method of claim 8, further comprising: storing, subsequent to the compressing, the digital image file within a persistent storage of the at least one computing device.

10. The method of claim 8, wherein each of the plurality of components of the digital image file is compressed separately from each other component of the plurality of components.

11. The method of claim 8, further comprising: associating, prior to the forming, the indicator with a compressed component of the plurality of compressed components.

12. The method of claim 11, wherein the associating is performed without decompressing the at least one component.

13. In a digital medium environment for digital image synchronization and storage, at least one computer-readable storage medium storing processor-executable instructions that, responsive to execution by a processing system, cause the processing system to perform operations comprising:
altering a local instance of a digital image file by an image editing application, the altering including:
assigning a virtual memory reference to a portion of the digital image file;
receiving an alteration to the portion of the digital image file; and
assigning, responsive to the receiving, physical memory to the virtual memory reference;
storing the altered image as a composite digital image file with a plurality of components;
identifying at least one component that includes the altered portion of the digital image file based on the assigning the physical memory to the virtual memory reference; and
forming a communication as including the identified component and as not including at least one other component of the plurality of components that does not correspond to the altered portion of the digital image document, the communication configured to cause synchronization of the identified component with a remotely stored instance of the digital image file.

14. The at least one computer-readable storage medium of claim 13, wherein the communication does not cause synchronization of the at least one other component with the remotely stored instance of the digital image file.

15. The at least one computer-readable storage medium of claim 13, wherein each component of the digital file corresponds to one of a layer, a channel, or a tile of a digital image document associated with the digital file.

16. The at least one computer-readable storage medium of claim 13, wherein at least one component of the digital file corresponds to a nested image document.

17. The at least one computer-readable storage medium of claim 13, wherein at least one component of the digital file corresponds to one of a layer, a channel, or a tile of a nested image document.

18. In a digital medium environment for digital image synchronization and storage, a system comprising:
means for editing a digital image document by an image editing application, the digital image document stored in non-persistent storage and corresponding to a local instance of a digital image file stored in persistent storage of a computing device;
means for generating an indicator referencing a portion of the digital image document that has been edited within the non-persistent storage of the computing device;
means for receiving an input to initiate storing of the digital image document;
means for compressing, in response to the input, the indicated portion of the digital image document into a component of a plurality of components of the digital image file; and
means for forming a communication as including the compressed component and as not including at least one other component of the plurality of components that does not correspond to the portion of the digital image document that has been edited, the communication configured to cause synchronization of the compressed component with a remotely stored instance of the digital image file.

19. The system of claim 18, wherein the communication does not cause synchronization of the at least one other component with the remotely stored instance of the digital image file.

20. The system of claim 18, wherein the non-persistent storage is a virtual memory mechanism.

* * * * *